May 14, 1935.   R. E. FRICKEY   2,001,097
HARDNESS TESTER
Filed Oct. 2, 1933
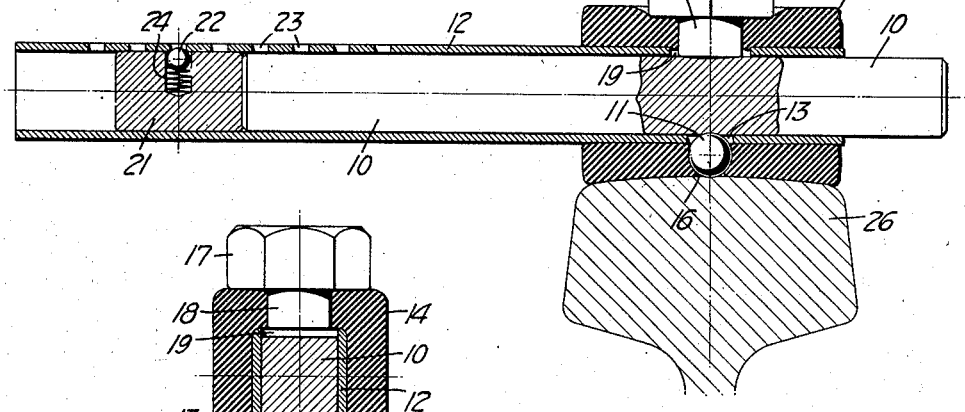
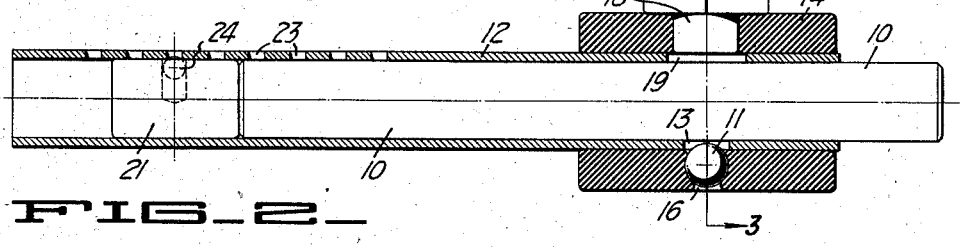
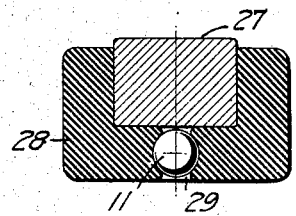 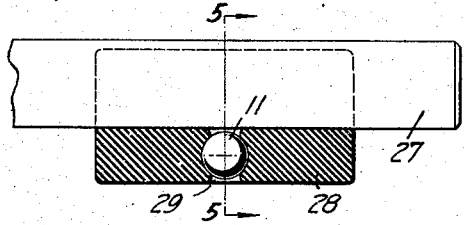
INVENTOR
Royal E. Frickey
BY
White, Prost, Flehr & Lothrop
ATTORNEYS Patented May 14, 1935

2,001,097

UNITED STATES PATENT OFFICE 2,001,097

HARDNESS TESTER

Royal E. Frickey, San Francisco, Calif., assignor to Welding Service, Inc., San Francisco, Calif., a corporation of California Application October 2, 1933, Serial No. 691,750

3 Claims. (Cl. 265—13)

This invention relates generally to devices for determining the hardness of various metal bodies.

It is an object of the invention to provide a device of the above character which will be of utmost simplicity, and which can be utilized under field conditions as well as in laboratories or shops. In this connection the invention is characterized by the use of a relatively few numbers of parts which are of rugged construction, and which can be relied upon to give the results desired.

A further object of the invention is to provide a hardness testing device which will have an accuracy comparing favorably or even superior to more complicated prior devices for this purpose.

Further objects of the invention will appear from the following description in which the preferred embodiments of the invention are set forth in detail in conjunction with the accompanying drawing.

Referring to the drawing:

Figure 1 is a side elevational view, in cross section illustrating a device incorporating the present invention, and showing the manner in which comparative indentations or impressions are made.

Fig. 2 is a view similar to Fig. 1, but showing the device in its normal form.

Fig. 3 is a cross sectional detail taken along the line 3—3 of Fig. 2.

Fig. 4 is a side elevational view, showing a simplied modification of the invention.

Fig. 5 is a cross sectional detail taken along the line 5—5 of Fig. 4.

Referring first to that form of the invention illustrated in Figs. 1 to 3 inclusive, the device consists of a metal body in the form of a bar 10, which is of known hardness. Retained adjacent one side of this bar there is an impression member 11 in the form of a metal ball which should be of greater hardness than either the bar 10 or the body to be tested. To serve as means for retaining the ball 11 in its desired position, and also to facilitate handling of the device, the bar is shown slidably disposed within a metal sleeve 12. This sleeve is provided with an aperture 13 so that the ball 11 may directly contact one face of the bar. Surrounding one end portion of the sleeve 12 there is a body 14 of suitable resilient material, such as soft vulcanized rubber. The lower side of body 14, which is intended to contact one face of the "work" or body to be tested, is provided with an aperture 16, within which the ball 11 is retained. In this connection it should be noted that aperture 16 is normally of less diameter than the diameter of ball 11, whereby the side walls of the aperture are distorted to form an effective frictional engagement.

In order to facilitate the imparting of a proper impact or blow to the bar 10, without scarring the same, I have shown a metal head 17 fixed within the upper portion of body 14. The depending portion 18 of head 17 is normally slightly out of contact with the upper side of bar 10, but may be forced downwardly into contact with the bar, thru the aperture 19 in sleeve 12.

In order to locate bar 10 in definitely spaced positions in taking successive impressions, detent means somewhat as illustrated can be employed. Thus, slidably disposed within sleeve 12 there is a sliding block 21, against which one end of bar 10 may abut. Disposed within this block there is a detent ball 22, which may engage in spaced apertures 23 formed in sleeve 12. Ball 22 is shown urged outwardly by compression spring 24.

The device described above is operated as follows: It will be presumed that the operator wishes to determine the approximate hardness of the upper surface of a railroad rail 26. The operator grasps sleeve 12, and then contacts the lower face of resilient body 14 with the upper surface of the rail, with the axis of the bar 10 extending substantially parallel to the surface being tested. The head 17 is now struck a blow with a hammer or like tool, thus causing this head in turn to force bar 10 downwardly against ball 11, whereby the ball is caused to indent or form an impression in both the underside of the bar 10 and the surface of the rail 26. The operator now inspects the indentation formed in the bar 10 and compares it with the indentation formed in the body 26. By the aid of a microscope or magnifying glass, the diameters of these indentations can be accurately determined. Knowing the hardness of the bar 10, it is possible from this data to determine the hardness of the surface of body 26, with fair accuracy. In this connection the data secured can be translated into terms of hardness by referring to suitable calibration curves, or can be determined by computation as follows:

Assuming that the test bar has a hardness of 400 Brinell, that $x$ represents the diameter of the impression in the test bar and $y$ represents the diameter of the impression in the body being tested, then the hardness of the body can be determined by the following equation:—

$$H = \left(\frac{x}{y}\right)^2 \times 400$$

For example if the test bar impression is 3.3 millimeters in diameter and the impression in the body 3.2 millimeters, the hardness of the body is $$\left(\frac{3.3}{3.2}\right)^2 \times 400 = 424$$

In the device of Figs. 4 and 5 certain parts of the modification described above have been omitted for the sake of simplicity. Thus a test bar 27 is provided, which has a slidable friction engagement with the body 28 of resilient material. Body 28 is provided with an aperture 29 within which the hard metal ball 11 is retained. This simplified device is utilized in the same manner as the modification of Figs. 1 to 3 inclusive, except that the blow from a hammer or like tool is applied directly to the upper side of the bar 27. In making successive impressions the body 28 is moved to different spaced positions along the bar 27.

It is characteristic of my device that in making an impression, substantially no movement is imparted to ball 11, but this ball is caused to simultaneously indent both the bar of known hardness, and the surface of the body being tested. Provided a single blow is applied with a hammer or like tool, the ball is instantaneously driven into both the test bar and the surface of the body being tested, and is then immediately retracted, due to expansion of the rubber which is compressed during the interval that the blow is applied. The rubber surface which contacts the surface being treated prevents lateral skidding at the time a blow is struck, thus insuring a proper impression at all times. Assuming that the operator uses the device with a fair degree of intelligence, and applies a hammer blow of reasonable momentum in taking successive readings, a high degree of accuracy will be afforded.

I claim:

1. In a hardness testing device, a metal member of known hardness, an impression ball substantially harder than said member and adapted to be interposed between one side of said member and the body to be tested, whereby an impact upon said member causes the ball to simultaneously indent both said member and said body, and means forming a yieldable work-engaging friction surface surrounding the ball, said surface being spaced from the bar a distance greater than the diameter of the ball.

2. In a hardness testing device, a metal bar of known hardness, an impression ball formed of metal substantially harder than the metal of said bar and adapted to be interposed between one side of said bar and the body to be tested, whereby an impact upon said bar causes said ball to indent both the bar and said body simultaneously, and means including a body of resilient vulcanized rubber for retaining said ball adjacent one side of said bar and for forming a work engaging friction surface.

3. In a hardness testing device, a metal bar of known hardness, an impression ball formed of metal substantially harder than the metal of said bar and adapted to be interposed between one side of said bar and the body to be tested whereby an impact upon said bar causes said ball to indent both the bar and said body simultaneously, and a body of resilient vulcanized rubber surrounding the ball at one side of the bar, said last body forming a friction surface for engaging with the body to be tested, the friction surface being spaced from the bar a distance greater than the diameter of the ball.

ROYAL E. FRICKEY.